United States Patent
Kaussen

[11] Patent Number: 5,931,970
[45] Date of Patent: Aug. 3, 1999

[54] PROCESS FOR TREATING LEATHERS WITH SURFACTANTS TO IMPROVE WATER REPELLENCY

[75] Inventor: Manfred Kaussen, Aachen, Germany

[73] Assignee: Stockhausen GmbH & Co. KG, Krefeld, Germany

[21] Appl. No.: 08/952,162

[22] PCT Filed: May 3, 1996

[86] PCT No.: PCT/EP96/01850

§ 371 Date: Nov. 12, 1997

§ 102(e) Date: Nov. 12, 1997

[87] PCT Pub. No.: WO96/35814

PCT Pub. Date: Nov. 14, 1996

[30] Foreign Application Priority Data

May 12, 1995 [DE] Germany ............ 195 16 963

[51] Int. Cl.$^6$ .................................................. C14C 9/00
[52] U.S. Cl. .................. 8/94.2; 8/94.14; 8/94.15; 8/94.18; 8/94.21; 427/389; 252/8.57
[58] Field of Search ................. 8/94.14, 94.18, 8/94.2, 94.21, 94.15, 94.1 R; 427/389; 435/263, 265; 252/8.57

[56] References Cited

U.S. PATENT DOCUMENTS

| | | | |
|---|---|---|---|
| 2,964,425 | 12/1960 | Holzinger et al. | 428/540 |
| 3,322,490 | 5/1967 | Gagliardi . | |
| 4,701,269 | 10/1987 | Bay et al. | 252/8.57 |
| 4,740,210 | 4/1988 | Amati . | |
| 4,968,621 | 11/1990 | Pfleiderer et al. | 435/265 |
| 4,973,427 | 11/1990 | Amati . | |
| 5,166,337 | 11/1992 | Ripke | 536/126 |
| 5,286,263 | 2/1994 | Schaffer . | |
| 5,501,707 | 3/1996 | Schieferstein . | |
| 5,503,754 | 4/1996 | Counts et al. | 252/8.57 |
| 5,525,509 | 6/1996 | Christner et al. | 435/265 |
| 5,534,035 | 7/1996 | Allen et al. | 8/94.21 |
| 5,658,484 | 8/1997 | Lohmann . | |

FOREIGN PATENT DOCUMENTS

| | | |
|---|---|---|
| 213480 | 3/1987 | European Pat. Off. . |
| AS 1175198 | 8/1964 | Germany . |
| 3529869 | 2/1987 | Germany . |
| 44 15 062 | 11/1995 | Germany . |
| WO 95/13400 | 5/1995 | WIPO . |
| WO 95/27800 | 10/1995 | WIPO . |

OTHER PUBLICATIONS

Ullmann's Encyclopedia of Industrial Chemistry, fifth edition, vol. A15, pp. 274–277, 1990.
Stather, Gerbereichemie Und Gerbereitechnologie (Tanning Chemistry and Tanning Technology), pp. 566 and 715, Akademie–Verlag, Berlin (1867) (month unknown).
Hayden, Tenside Als Hilfsmittel Zur Herstellung Wasservester Leder (Surfactants as Auxillary Agents in the Production of Water–Resistant Leather), *Das Leder* 20:4–8 (1969) (Month Unknown).
Pauckner, et al., "Neuere Untersuchungen ueber die Hydrophobierung von Leder" (New Investigations on the Hydrophobizing of Leather), *Das Leder* 28:97–107 (1977) (Month Unknown).
Kneip, "Polymere in der Fettung und Hydrophobierung von Leder" (Polymers in the Fat–Liquoring and Hydrophobization of Leather), *Das Leder*, No. 5, pp. 106, 108–109 (1995) (Month Unknown).

*Primary Examiner*—Alan Diamond
*Attorney, Agent, or Firm*—Evenson, McKeown, Edwards & Lenahan, P.L.L.C.

[57] ABSTRACT

The present invention relates to a process for improving the waterproofing of hides, skins, leathers, and furs, as well as other fibrous materials, by treatment with special surfactants in the beamhouse and/or in the treatment of the wet blues, prior to waterproofing. Particularly suitable as surfactants are anionic surfactants based on salts of N-acyl-amino acids and nonionic surfactants, such as alkyl polyglycosides or polyethyleneglycol carboxyalkyl ethers. The surfactants are used in amounts of 0.5 to 5% wt., relative to the pelt or shaved weight.

8 Claims, No Drawings

PROCESS FOR TREATING LEATHERS WITH SURFACTANTS TO IMPROVE WATER REPELLENCY

This application is a 371 of PCT/EP96/01850 filed May 3, 1996.

The present invention relates to a process for treating hides and skins as well as tanned leather and fur with special surfactants to improve the water repellent action.

In the manufacturing process for waterproof leathers all hydrophilic substances are avoided to a large extent since they may impair the water repellent effect of ready-made leathers. In particular, these include salt-like compounds and surface-active substances, for example, surfactants. However, it is not possible to do completely without such wetting agents, detergents, soaking, dispersing and degreasing agents, since sufficient and uniform degreasing is necessary to manufacture high-quality articles. In practice the mildest possible nonionic surfactants have been used in minimum amounts, representing a compromise between the use of a surfactant required for degreasing and the resulting impairment of the wet blue material with respect to waterproofing.

Moreover, the increasing portion of wet blue material that is incorporated as intermediate product all over the world, has frequently made it necessary to carry out a so-called washing stage since the respective wet blue material, mainly for reasons of rapid through-put, has been degreased and prepared in an unsatisfactory manner. In addition, attention must be paid to the fact that different wet blues frequently are of a different quality and that there is the need to process the different wet blue materials into a uniform end product in one operation.

Another reason for quality reduction is the autoxidation of the natural fat remaining in the grain layer exposed to air, if stored for longer periods; and this is quite likely in case of wet blues (storage periods of up to one year are possible). Both events may result in the fact that the water repellent agent insufficiently penetrates the leather and therefore is not able to develop its action to the required degree.

Accordingly, it has been the object of the present invention to provide auxiliary agents and/or technologies to obtain an improved water repellent action by treating the wet blues or the hides and skins in the beamhouse. For this reason, these substances had to have a sufficient dispersing or emulsifying action. DE-OS 2 21 9 806 discloses the use of fatty acid amides as fatliquoring agents for materials having a fibrous structure. Fatliquoring of leather is carried out to impart a pleasant fatty handle to the material, and it has nothing to do with the waterproofing of leather. What is more, fatliquoring aims at producing soft leathers. Consequently, preferred compounds are the condensation products of the amino carboxylic acids sarcosine, β-alanine, o-amino-benzenedicarboxylic acid, and ε-aminocaproic acid with fatty acids of natural origin. The claimed compounds are exclusively used to fatliquor retanned leathers. A lower water absorbency is noted with this application; it is exclusively carried out in fatliquoring.

EP 0 21 3 480 describes oleic acid sarcoside and other sarcosides used as emulsifiers for silicone oils, and a process for waterproofing leathers and furs with these silicone oil emulsions. It claims the use of salts of N($C_9$–$C_{20}$-acyl) amino acids to emulsify silicone oil in aqueous phase in the water repellent treatment. This process is carried out during or after retannage.

Amides and anilides of higher fatty acids are described in literature as effective detergents, wetting, dispersing and leveling agents in the textile industry (DE 635 522), and they are used. Because of the pronounced hydrophilic properties they are avoided in waterproofing: Like almost all water repellents, all surfactants or strongly emulsified fatliquors impair the water repellent action in this case as well (BASF, technical notice to Densodrin S, issue May 1988).

Most surprisingly, it has been found that—despite their hydrophilic action—the use of these surface-active substances results in an improvement of the water repellent effect. The used surfactants may be ionic or nonionic. Suitable anionic surfactants include, for example, the sarcosides, i.e. compounds of the type RCO—N($CH_3$) $CH_2$COO—. Saturated and unsaturated fatty acids, in particular those having a longer chain in the range of 16–22 C-atoms, are preferred as acid components, in particular oleic acid. These sarcosides support the formation of oil-in-water emulsions. Their strongest surface activity in aqueous solution is found at a slightly acid pH. For this reason they are applied immediately after incorporation of the wet blue in washing or wetting back, or during neutralization.

It is also possible to use these components during operations in the beamhouse. For example, it may be expedient to use them in degreasing because these surfactants can easily form emulsions of fatty substances.

The products are used in the form of their water-soluble salts, e.g., as alkali salts, in particular of sodium or potassium, as ammonium salts, or as salts of a mono-, di-, or trialkanolamine, with mono-, di-, or triethanolamine being preferred. The amounts used range between 0.5–5%, preferably between 1 and 5%, relative either to the pelt weight or to the shaved weight, depending on the field of application.

Application concentrations of 20–50%-wt. are preferred because of their good solubility and consistency.

In addition to sarcosides as representatives of certain fatty acid amides, the nonionic alkyl polyglycosides are also effective in the above-described fields of application. They offer themselves to intensify degreasing because of their low foam formation and their marked property of forming microemulsions. The preferred types are those whose residue at the glucose unit is at least in the range of $C_{12}$–$C_{16}$, or rather, $C_{16}$–$C_{18}$, or of a longer chain. This residue may be saturated, unsaturated, straight-chain, or branched. To avoid excessive hydrophilic properties, a glycosidation degree of 1 to 3 is preferred. The alkyl polyglycosides are present in solid to waxy consistency. They have good properties when used together with other surfactants, for example, the sarcosides.

Further suitable surfactants for the described application range are polyethyleneglycol carboxyalkyl ethers. These ether carboxylic acids of the general formula R(O$C_2H_4$)$_n$OO$H_2$COOH are preferably suitable if a hydrophobic portion, such as $C_{16}$–$C_{18}$ is present and if values for n between 2 and 5 are valid.

The products are used in the form of their aqueous solution, mostly with 50–70%-wt. of active substance. The quantities used range between 0.5 to 5%-wt., relative to the pelt weight or shaved weight; in case of pelts they preferably amount to about 0.5–3%-wt., when wet blues are washed or wetted back to about 2–5%-wt.

All surfactants used according to the present invention are preferably used in amounts of 0.5 to 3%-wt. for pelts, and in amounts of 2 to 5%-wt. for washing or wetting back wet blues.

The surfactants are used in known manner from the aqueous float. The subsequent steps of the leather manufacture are not changed. High-grade and strongly waterproofed leathers are formed having good handle and physical properties.

Waterproofing is carried out according to known methods and with known means.

The following embodiment examples will illustrate the process according to the present invention:

EXAMPLES

The following standard operation was used:

| Operation for waterproofed upper leathers | | | |
|---|---|---|---|
| Material: | cattle hide, wet blue of different origins and production | | |
| Shaved substance: 1.8–2.0 mm | | | |
| Percentages, relative to shaved weight | | | |
| WASHING: | 300.0% | water 30° C. ) | |
| | 0.2% | acetic acid 1:5 ) 15 min. | |
| Drain off bath | | | |
| NEUTRALIZATION/ | 150.0% | water 35° C. | |
| RETANNAGE/ | 2.0% | sodium formate undiss. ) | |
| DYEING: | + 0.2% | sodium hydrogencarbonate 1:10 ) | 90 min. |
| | + 3.0% | dye undiss. | 15 min. |
| | 3.0% | polym retan. ag. 1:3/30° C. | 15 min. |
| | + 4.0% | synth. replace tann. mat. ) | |
| | + 12.0% | quebracho ) | undiss. 30 min. |
| | | autom. movem. overnight | |
| | | rest 1 hr./run 5 min. | |
| | | through-dyed | overnight |
| | + 250.0% | water 60° C. | 10 min. |
| 2 × WASHING | 300.0% | water 60° C. | each 10 min. |
| WATERPROOFING: | 100.0% | water 60° C. | |
| | 10.0% | water repellent 1:4 | 60 min. |
| | + 0.3% | formic acid 1:5 15 min. | |
| | + 2.5% | chrome tanning undiss. material | 45 min. |
| Drain off bath | | | |
| 2 × WASHING: | 300.0% | water 20° C. | each 10 min. |
| Drain off bath | | | |

Leather horse-up overnight, sammying, setting out, vacuum drying (4 min./80° C.), conditioning, staking, plating.

Example 1

In comparison with the standard operation, a treatment was carried out in a parallel test wherein, after neutralization, 5% of a 20%-wt. solution of oleic acid sarcoside monoethanolamine salt was used at 35° C. over a period of 60 minutes. Waterproofing was carried out with a product based on sulfosuccinic acid ester comprising polymer portions.

Whereas the leather merely treated with the water repellent showed water penetration in the Bally penetrometer after 44 minutes (10% amplitude), the treatment according to the present invention increased the water penetration time to >420 minutes (10% amplitude).

Example 2

The same procedure as in Example 1 was used with another wet blue origin. A paraffin- and silicone oil emulsion was used as water repellent.

Whereas waterproofing according to standard operation provided comparable results with respect to the Bally penetrometer-water penetration values (both >420 minutes at 10% amplitude), the surfactant treatment resulted in a distinct decrease of the water absorption from 20 to 9%.

Example 3

Wet blue material was treated as in Example 1. In a parallel test, the additional use of oleic acid sarcoside-MEA-salt improved the result in the Maeser test from 215 flexes to 12,400 flexes, which represents good waterproofing.

Example 4

The same wet blue material as in Example 3 was processed as in Example 1, however, the water repellent based on paraffin and silicone oil was used.

The use of oleic acid sarcoside-monoethanolamine-salt in the neutralization improved the very good value for the Maeser test from 67,950 flexes to 110,500 flexes.

I claim:

1. A process for waterproofing a material comprising the steps of:

treating the material with an anionic surfactant, wherein said anionic surfactant is a salt of an N-acyl-amino acid and wherein said material is selected from the group consisting of hides, skins, leathers, wet blues, and furs, wherein the hides, skins, leathers or furs are treated with the anionic surfactant during beamhouse processing; and subsequently waterproofing said treated material.

2. The process according to claim 1, wherein said surfactant is an oleic acid sarcoside monoethanolamine salt.

3. The process according to claim 1, wherein said surfactant is in an aqueous float.

4. The process according to claim 1, wherein said material is leather and said surfactant is used in an amount of 0.5 to 5 wt. % relative to a shaved weight of said leather.

5. The process according to claim 1, wherein said surfactant is a sarcoside.

6. The process according to claim 1, wherein said treating is at an acid pH.

7. A process for waterproofing a material, comprising the steps of:

treating the material with a salt of an N-acyl-amino acid as an anionic surfactant, wherein said material is selected from the group consisting of hides, skins, leathers, wet blues, furs, and fibrous substances;

then retanning or dyeing the material; and subsequently waterproofing said material.

8. A process for waterproofing a material, comprising the steps of:

treating the material with a solution consisting of water and a salt of an N-acyl-amino acid as an anionic surfactant, wherein said material is selected from the group consisting of hides, skins, leathers, wet blues, furs, and fibrous substances; and subsequently waterproofing said material.

* * * * *